United States Patent
Yun et al.

(10) Patent No.: US 7,491,273 B2
(45) Date of Patent: Feb. 17, 2009

(54) APPARATUS FOR FORMING ALIGNMENT LAYER OF LIQUID CRYSTAL DISPLAY DEVICE

(75) Inventors: Heon-Do Yun, Daegu (KR); Hyun-Ho Song, Gumi (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 10/795,234

(22) Filed: Mar. 9, 2004

(65) Prior Publication Data

US 2004/0196349 A1    Oct. 7, 2004

(30) Foreign Application Priority Data

Apr. 3, 2003    (KR) .................. 10-2003-0021136

(51) Int. Cl.
*B05C 11/10*    (2006.01)
(52) U.S. Cl. .................. 118/664; 118/665; 118/679; 118/712; 118/713
(58) Field of Classification Search .................. 118/664, 118/665, 679, 712, 713; 347/74, 78, 81
See application file for complete search history.

(56) References Cited

U.S. PATENT DOCUMENTS

| | | | | |
|---|---|---|---|---|
| 4,520,366 A | * | 5/1985 | Cragin, Jr. | .................. 347/74 |
| 5,077,565 A | * | 12/1991 | Shibaike et al. | .................. 347/15 |
| 6,471,352 B2 | | 10/2002 | Akahira | |
| 2001/0026307 A1 | * | 10/2001 | Akahira | .................. 347/101 |

* cited by examiner

*Primary Examiner*—George R Koch, III
(74) *Attorney, Agent, or Firm*—McKenna Long & Aldridge, LLP

(57) ABSTRACT

An apparatus for forming an alignment layer of a liquid crystal display device includes: an alignment material dropping unit with a head having a plurality of holes for dropping an alignment material on the substrate; an alignment material supply unit to supply the alignment material to the alignment material dropping unit; a scan unit to survey alignment material dropping from the head; and a monitor to display an image base upon scan data from the scan unit so that the discharge state of the plurality of holes in the head can be checked.

9 Claims, 4 Drawing Sheets

APPARATUS FOR FORMING ALIGNMENT LAYER OF LIQUID CRYSTAL DISPLAY DEVICE

This application claims the benefit of Korean Patent Application No. 2003-21136 filed in Korea on Apr. 3, 2003, which is hereby incorporated by reference in its entirety.

BACKGROUND OF THE INVENTION

1. Field of the Invention

The present invention relates to an alignment layer of liquid crystal display device, and more particularly, to an apparatus for forming an alignment layer of liquid crystal display device.

2. Description of the Related Art

Because of the recent developments in various portable electronic devices, such as mobile phones, PDAs and notebook computers, the demand for a light, thin, small flat panel display device is increasing. Research is actively ongoing on several types of flat panel display devices including LCD (Liquid Crystal Display), PDP (Plasma Display Panel), FED (Field Emission Display), VFD (Vacuum Fluorescent Display) and other technologies. Of the aforementioned flat panel display devices, the LCD has received much attention because it is simple to mass produce and can be easily used with a driving system that implements a high quality picture.

FIG. 1 is a cross-sectional view of a related art liquid crystal display device. As shown in FIG. 1, a liquid crystal display device 1 includes a lower substrate 5, an upper substrate 3 and a liquid crystal layer 7 formed between the lower substrate 5 and the upper substrate 3. The lower substrate 5 is a driving unit array substrate that includes a plurality of pixels (not shown). Each of the pixels includes a driving unit, such as a thin film transistor. The upper substrate 3 is a color filter substrate that includes a color filter layer for implementing color in the liquid crystal display.

Pixel electrodes 9 are formed on the lower substrate 5 in FIG. 1. A common electrode 11 is formed on the upper substrate 3. Alignment layers 13 and 15 for aligning liquid crystal molecules in the liquid crystal layer 7 are respectively disposed on the pixel electrodes 9 and on the common electrode 11.

The lower substrate 5 and the upper substrate 3 are attached by a sealing material 17. Further, the sealing material 17 maintains and the liquid crystal layer 7 between the lower substrate 5 and the upper substrate 3. The liquid crystal molecules of the liquid crystal layer 7 are driven by driving units (not shown) formed on the lower substrate 5. The pixel electrodes 9 are connected to driving units (not shown). The quantity of light transmitted through the liquid crystal layer 7 is controlled by voltages supplied by the driving units (not shown) and applied across the liquid crystal layer 7 using the pixel electrodes 9 to display information visually.

FIG. 2 is a flow chart of a method for fabricating a liquid crystal display, device according to the related art. The fabrication process of the liquid crystal display device is roughly divided into a driving unit array substrate fabrication process for forming a driving unit on the lower substrate 5, a color filter substrate fabrication process for forming the color filter on the upper substrate 3, and a panel fabrication process. The panel fabrication process occurs after the color substrate fabrication process and the driving unit array substrate fabrication process.

As shown in FIG. 2, step S101 of the driving device array fabrication process includes forming a plurality of gate lines and a plurality of data lines on the lower substrate 5 to define a plurality of pixel areas, forming of thin film transistors in the driving areas, and forming driving devices that are connected to the gate lines and the data lines. In addition, the pixel electrodes 9, which are connected to the thin film transistors, are formed for driving a liquid crystal layer in response to a signal transmitted through the thin film transistor.

Step S104 of the color filter substrate fabrication process includes forming a color filter layer on the upper substrate. The color filter layer has R, G and B colors. A common electrode is then subsequently formed on the upper substrate.

Steps S102 and S105 of both the driving unit array substrate fabrication process and the color filter substrate fabrication process include formation of alignment layers on the upper and lower substrates. The alignment layers are rubbed in a specific direction. The alignment layers provide an initial alignment and surface fixing force (i.e., pre-tilt angle and orientation direction) to the liquid crystal molecules of the liquid crystal layer formed between the upper and lower substrates.

Step S103 includes scattering a plurality of spacers onto the lower substrate for maintaining a uniform cell gap between the upper and lower substrates. Step S106 includes formation of a sealing material along an outer portion of the upper substrate. Thus, as described above, steps S101 to S106 depict the color substrate fabrication process and the driving unit array substrate fabrication process.

As shown in FIG. 2, step S107 of the panel fabrication process includes attaching the upper and lower substrates by compressing the upper and lower substrates together. Step S108 of the panel fabrication process includes dividing the attached upper and lower substrates into a plurality of individual liquid crystal panels. Step S109 of the panel fabrication process includes injecting the liquid crystal material into the liquid crystal panels through a liquid crystal injection hole, and then the liquid crystal injection hole is sealed to form the liquid crystal layer. Step S110 of the panel fabrication process includes testing the injected liquid crystal panel.

Operation of the LCD device makes use of an electro-optical effect of the liquid crystal material, wherein anisotropy of the liquid crystal material aligns liquid crystal molecules along a specific direction. Accordingly, control of the liquid crystal molecules significantly affects image stabilization of the LCD device. Thus, formation of the alignment layer is critical for fabricating an LCD device that produces quality images.

FIG. 3 is a schematic view of a method for forming an alignment layer using a roller coating method according to the related art. In FIG. 3, an alignment material 21 is uniformly supplied between an anylox roll 22 and a doctor roll 23 as the anylox roll 22 and the doctor roll 23 rotate. The alignment material 21 is provided using a dispenser 20 having an injector shape. Then, the alignment material 21 formed on a surface of the anylox roll 22 transfers onto a rubber plate 25 when the anylox roll 22 rotates while contacting a printing roll 24 upon which the rubber plate 25 is attached. A mask pattern is formed on the rubber plate 25 to selectively print the alignment layer on the substrate 26. The mask pattern of the rubber plate 25 is aligned with a substrate 26 upon which the alignment material 21 will be applied.

As a printing table 27, upon which the substrate 26 is loaded, is moved to contact the printing roll 24, the alignment material 21 is transferred onto the rubber plate 25 and is then subsequently transferred onto the substrate 26 to form an alignment layer. The thickness of the alignment layer is about 500 Å (angstroms) to 1000 Å (angstroms). However, a thickness variation of 100 Å (angstroms) in the alignment layer may generate a blot on the screen of the LCD device. Accordingly, an alignment layer having a uniform thickness is critical to display quality images on the screen of the LCD device.

The dispenser 20 supplies the alignment material 21 between an anylox roll 22 and a doctor roll 23 using a sweeping left-to-right motion along at an upper part of the anylox roll 22. As a result, the dispensing in a sweeping left-to-right motion, the thickness of the resulting alignment layer may not be consistent. As a size of the substrate 26 increases, it becomes increasingly more difficult to form the alignment layer having a uniform thickness. For example, the thickness at the side edges of the alignment layer corresponding to the ends of the sweeping left-to-right motion is different than the middle of the alignment layer.

Since all of the alignment material 21 transferred on the rubber plate 25 is not necessarily transferred onto the substrate 26, a significant amount of the alignment material 21 is wasted as compared to the amount of alignment material 21 that was transferred onto the substrate 26. Accordingly, the amount of wasted alignment material 21 unnecessarily increases production costs. Further, a cleaning process must be periodically performed that complicates processing and degrades productivity. In addition, when the size of the substrate changes because of the need to produce another model, the roll (doctor roll, anylox roll, printing roll) must be replaced. Furthermore, as the substrate is enlarged in size, the size of the roll printing device (i.e., the anylox roll and the printing roll) is increased. That is, the large substrate needs the corresponding large equipment, and in this case, it is difficult to maintain a uniform thickness of the alignment layer.

SUMMARY OF THE INVENTION

Accordingly, the present invention is directed to an apparatus for forming alignment layer of a liquid crystal display device that substantially obviates one or more of the problems due to limitations and disadvantages of the related art.

An object of the present invention is to provide an apparatus for forming an alignment layer of a liquid crystal display device with uniform thickness over entire substrate.

Another object of the present invention is to provide an apparatus for forming an alignment layer of a liquid crystal display device that reduces fabrication cost.

Another object of the present invention is to provide an apparatus for forming an alignment layer of a liquid crystal display device capable of forming an alignment layer that can check whether the discharge of alignment material is normal.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an apparatus for forming an alignment layer of a liquid crystal display device includes: an alignment material dropping unit with a head having a plurality of holes for dropping an alignment material on the substrate; an alignment material supply unit to supply the alignment material to the alignment material dropping unit; a scan unit to survey alignment material dropping from the head; and a monitor to display an image base upon scan data from the scan unit so that the discharge state of the plurality of holes in the head can be checked.

In another aspect, an apparatus for forming an alignment layer of a liquid crystal display device includes: an alignment material dropping unit with a head having at least a first hole for dropping an alignment material on the substrate; an alignment material supply unit to supply the alignment material to the alignment material dropping unit; a scan unit to survey alignment material dropping from the first hole; an image interpreting unit to receive scan data from the scan unit and interpreting the scan data to produce representative data; and a monitor to receive the representative data and displaying a representative image indicative of the discharge state for the first hole.

In yet another aspect, an apparatus for forming an alignment layer of a liquid crystal display device includes: an alignment material dropping unit with a head having a plurality of holes for dropping an alignment material on the substrate; an alignment material supply unit to supply the alignment material to the alignment material dropping unit; a scan unit generating scan data based upon a survey of alignment material dropping from the head; an image interpreting unit to receive scan data from the scan unit and interpreting the scan data to produce representative data; and a monitor to receive the representative data and displaying a representative image indicative of the discharge state for the plurality of holes in the head.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a unit of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

Figure 1:
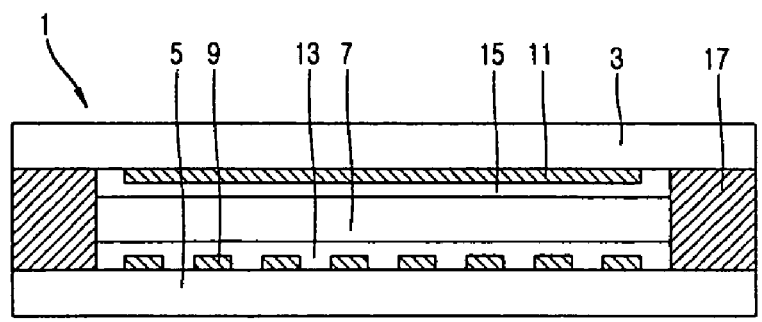
FIG. 1 is a cross-sectional view of a related art liquid crystal display device.
Figure 2:
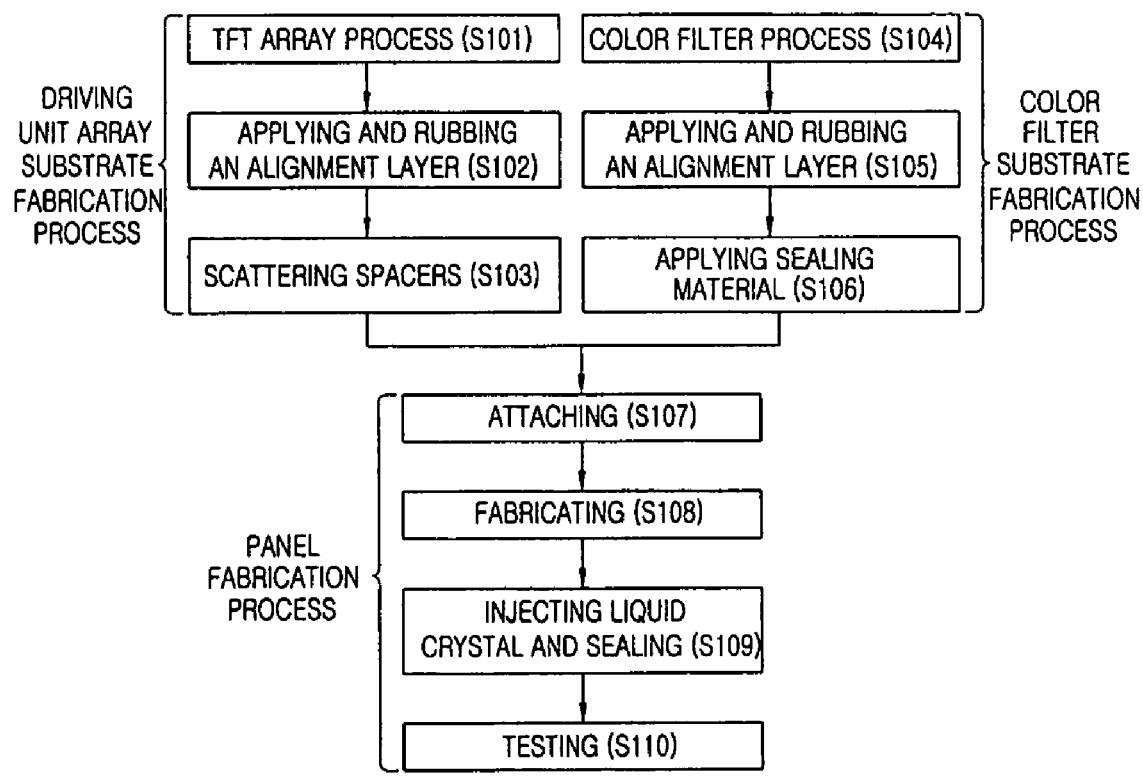
FIG. 2 is a flow chart of a method for fabricating a related art liquid crystal display device.
Figure 3:
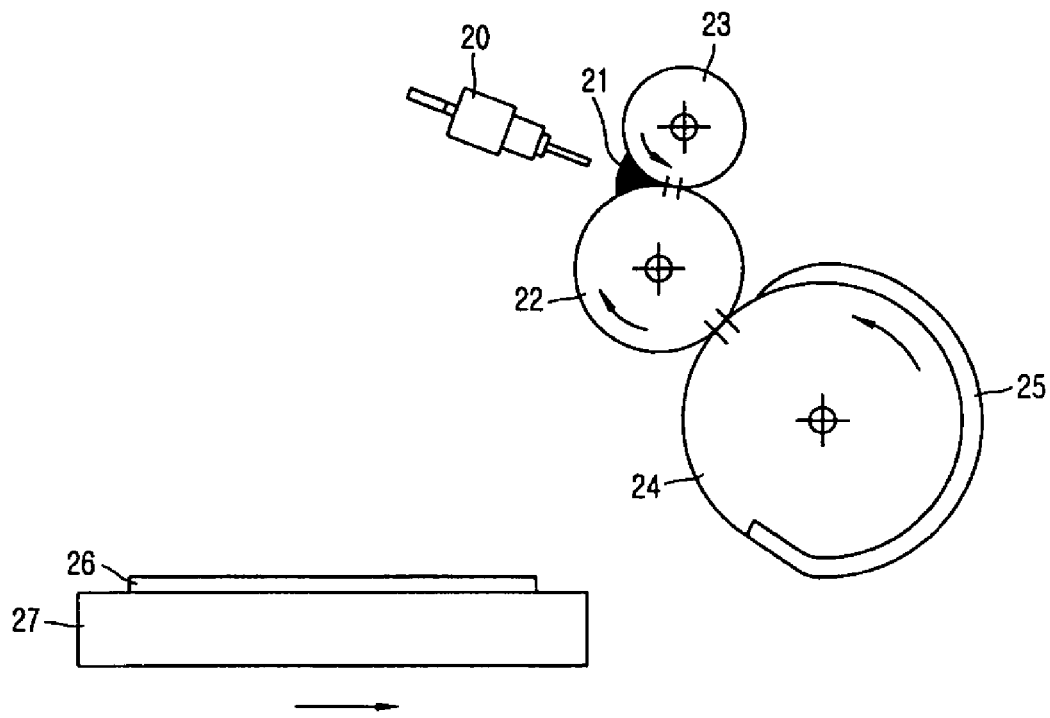
FIG. 3 is a schematic view of a method for forming an alignment layer according to the related art.
Figure 4:
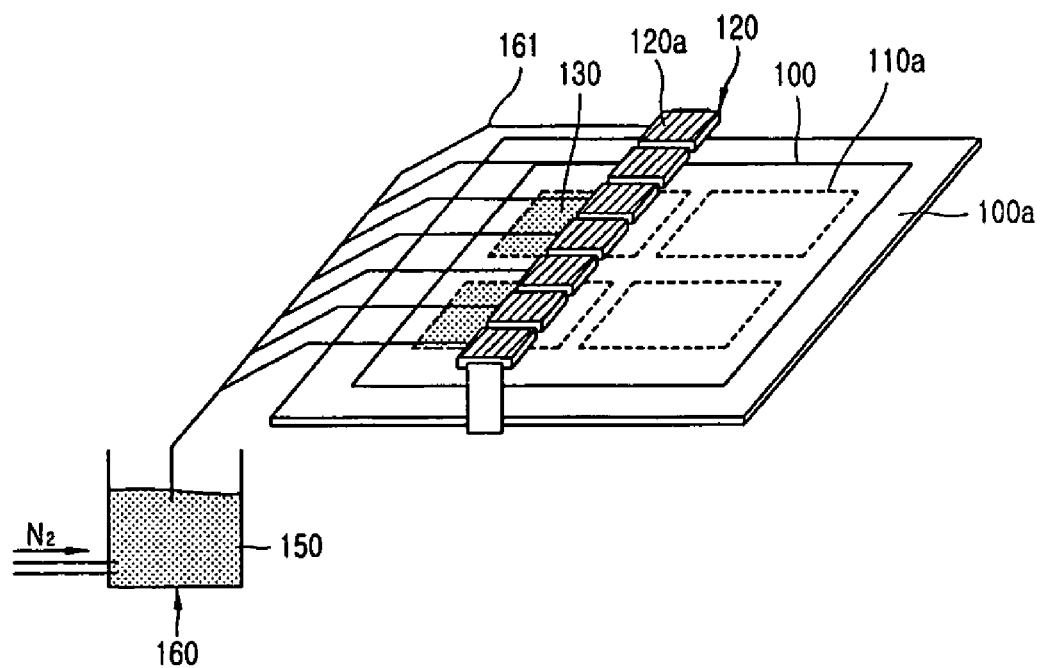
FIG. 4 is a schematic view of an apparatus for forming an alignment layer.

FIG. 4 is a schematic view of an apparatus for forming an alignment layer. As shown in FIG. 4, the alignment layer forming apparatus includes an alignment material dropping unit 120 for dropping an alignment material on a substrate and a stage 100a on which the alignment material dropping unit 120 is affixed. After the substrate 100 is prepared, the substrate 100 is loaded on the stage, and then the alignment layer 130 is formed on the substrate 100.

The substrate 100 is a mother substrate on which a plurality of substrates for a plurality of unit panels are disposed. For example, the substrates 110 of the mother substrate 100 can be thin film transistor array substrates or color filter substrates that respectively resulted from a thin film transistor array process and a color filter process.

In the thin film transistor array process, a first transparent substrate is prepared, and then, a plurality of gate lines and a plurality of data lines defining pixel areas are formed vertically and horizontally on the substrate. Subsequently, a driving device, such as a thin film transistor, is connected to the gate lines and the data lines in each pixel area. A passivation layer is formed over the thin film transistor and the entire pixel area, and then, a transparent pixel electrode is formed over the passivation layer.

In the color filter process, a second transparent substrate is prepared, and then, a black matrix is formed on the second transparent substrate. Subsequently, color filters are formed on the second transparent substrate corresponding to each of the pixel areas. Then, a common electrode is formed over the color filters and the black matrix.

The alignment layer forming apparatus in FIG. 4 is used to form an alignment layer 130 on the substrate 100. The alignment layer forming apparatus employs an ink-jet method and includes an alignment material dropping unit 120 for directly dropping an alignment material on the substrate 100, an alignment material supply unit 160 for supplying an alignment material 150 to the alignment material dropping unit 120, and an alignment material supply pipe 161 for mechanically connecting the alignment material dropping unit 120 and the alignment material supply unit 160. The alignment material supply pipe 161 also supplies the alignment material 150 to the alignment material dropping unit 120.

The alignment material dropping unit 120 includes a plurality of holes. A supply amount of the alignment material to be dropped on the substrate and a dropping position of the alignment material are controlled by opening and closing the holes. Further, the amount of alignment material to be dropped on the substrate is controlled by the size of the hole. In addition, an alignment layer process time can be controlled by controlling the number of holes.

When a nitrogen gas ($N_2$) is supplied to the alignment material supply unit 160 storing the alignment material 150, a pressure in the alignment material supply unit 160 is increased due to the nitrogen gas, and accordingly, the alignment material 150 is introduced into the alignment material dropping unit 120 through the alignment material supply pipe 161. At this time, the introduced alignment material is dropped on the substrate 100 through the holes formed in the alignment material-dropping unit 120, forming an alignment layer with a uniform thickness on the substrates 110.

A uniform alignment layer is made by moving the stage 100a on which the substrate 100 is positioned or the alignment material dropping unit 120, in concert with alignment material dropping from the alignment material-dropping unit 120. An alignment layer 130 is selectively formed on a region 110 of the mother substrate 100 where the alignment material dropping unit 120 has passed. In this case, the alignment layer 130 can be selectively formed by closing some holes in the alignment material dropping unit 120 when the alignment material dropping 120 is moved over the stage (not shown) to supply the alignment material 130a on the substrate 100. The alignment layer-formed area is substantially the area where either thin film transistor array substrates or color filter substrates have been formed.

The alignment material dropping unit 120 includes at least one head 120a having the plurality of holes with which a row of alignment material dropping areas 130 that were dropped by the head can be controlled, regardless of the length of the mother substrate. Of course, more heads can be added to accommodate other alignment material dropping areas 130, regardless of the length of the mother substrate. Furthermore, the width in a column direction of different rows alignment material dropping areas 130 can be different sizes.

Figure 5:
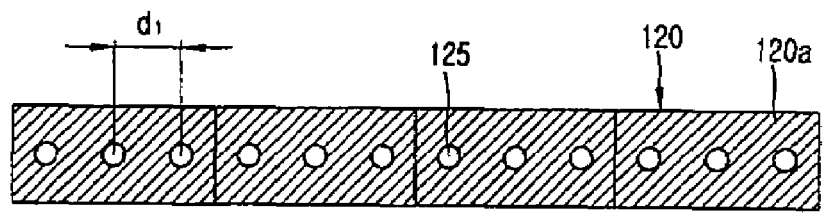
FIG. 5 is a plan view of the bottom of the alignment material dropping unit of an alignment layer forming apparatus.

FIG. 5 is a plan view of the bottom of the alignment material dropping unit 120. As shown in FIG. 5, the alignment material dropping unit 120 includes the plurality of heads 120a arranged in column direction. Each head 120a includes a plurality of holes 125 isolated at regular intervals d1. The alignment material is dropped on the substrate through the holes 125. Accordingly, by controlling the size of the hole 125 and the isolation interval d1 between holes 125, the thickness of the alignment layer and uniformity of the thickness of the alignment layer formed on the substrates 110 can be controlled. In addition, since each hole 125 can be opened and closed, even for a multi-model glass having two or more substrate models, the alignment layer can be easily formed by selectively opening and closing the holes.

As mentioned above, the alignment layer forming apparatus using the ink-jet method can easily cope with the various substrate models and a large substrate. Since the necessary amount of alignment material can be dropped directly on the substrate, consumption of the alignment material can be minimized so that fabrication cost of the liquid crystal display device can be considerably reduced. If foreign substances are stuck in a hole 125 of the alignment material dropping unit 120 or if a hole 125 the alignment material dropping unit 120 clogs for some other reason, the alignment material cannot be uniformly dropped in dropping the alignment material on the substrate, and thus, uniform thickness of the alignment layer formed on the substrate cannot be achieved.

To maintain a uniform thickness of the alignment layer, a method of checking the holes the alignment material dropping unit with the naked eye during dropping of the alignment material may be used. However, using the naked eye to determine proper dropping of the alignment material is very difficult, since the separation distance between the substrate 100 and the alignment material dropping unit 120 is very small, about 0.5 mm to 3 mm. Further, a partial clogging of a hole the alignment material dropping unit 120 is extremely difficult to detect with the naked eye.

Figure 6:
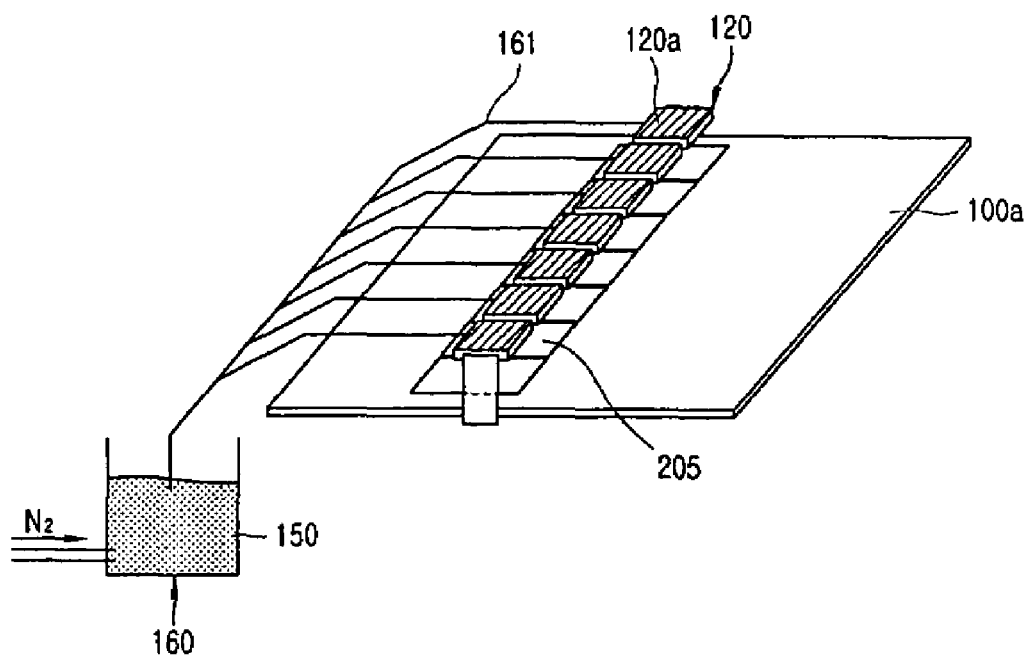
FIG. 6 is a schematic view showing a method for testing a discharge state of an alignment film.

FIG. 6 is a schematic view showing a method for testing a discharge state of an alignment film. As shown in FIG. 6, a test paper 205 is used to check whether the discharge state of the alignment material through the holes of the alignment material dropping unit 120 is normal. More particularly, the check is made by putting a test paper 205 on the stage 100a and then dropping the alignment material onto the test paper 205 using one head 120a at a time before the alignment material dropping unit 120 is used to form an alignment layer on a substrate. The heads are tested individually to determine whether a portion of a head 120a is properly dispensing.

The method for testing a discharge state of an alignment film using a test paper has a number of problems. One of the problems is that it takes a long time to complete the test since each of the heads are tested individually. Another problem is that discharging amount for each hole can not be accurately checked to determine if a hole is partially clogged. Further, testing a discharge state of an alignment film on a test paper may not necessarily be representative of alignment material dropping during an actual alignment layer forming process. For example, a hole of the alignment material dropping unit may clog during the alignment layer forming process.

To overcome such problems, exemplary embodiments of the present invention include a scan unit and a monitor to check the alignment material discharge of each head. Thus, the discharge state of a hole can be checked to determine whether the alignment material is properly being dropped during an alignment layer forming process. In an alternative, scan data from a scan unit from a survey of alignment material dropping from a hole is converted to a representative data indicative of the discharge state for the hole. The representative data can then be observed on a monitor. Further, a plurality of scan units that respectively correspond to a plurality of holes can be used such that each individual scan unit monitors a discharge state of the alignment material dropping from the hole that the scan unit monitors. Accordingly, the discharge state of every hole can be accurately monitored.

Figure 7:
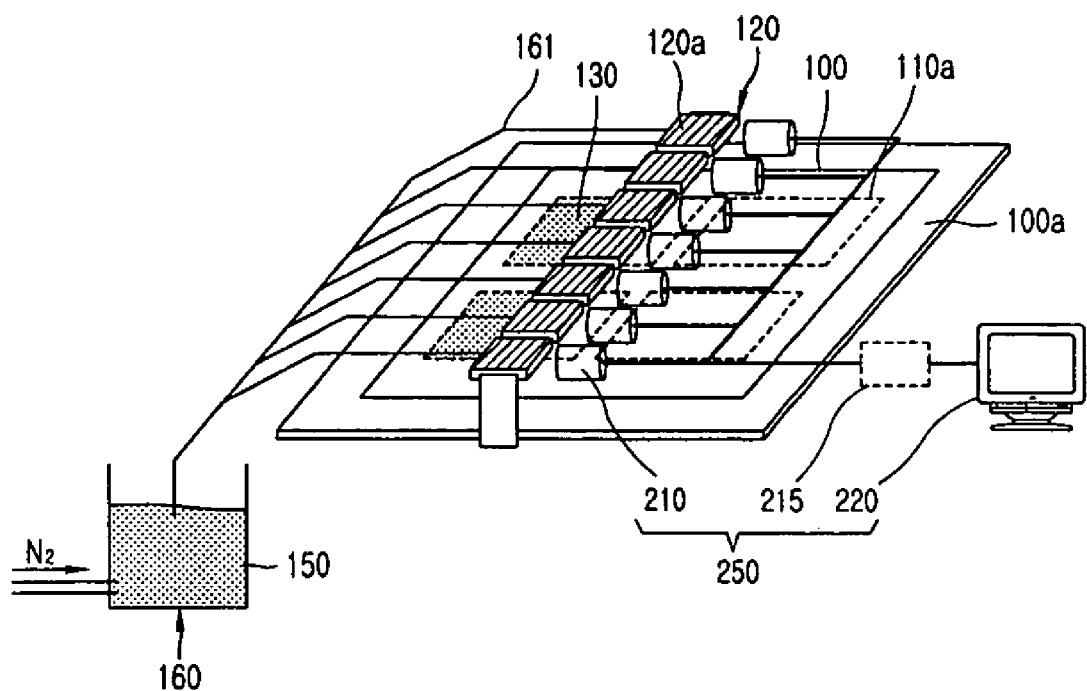
FIG. 7 is a schematic view showing an apparatus for forming an alignment layer of a liquid crystal display device in accordance with an embodiment of the present invention.

FIG. 7 is a schematic view showing an apparatus for forming an alignment layer of a liquid crystal display device in accordance with an embodiment of the present invention. As shown in FIG. 7, an apparatus for forming an alignment layer in accordance with the present embodiment includes an alignment material dropping unit 120 forming an alignment layer 130 on a thin film transistor or a color filter substrate 110a by substantially dropping an alignment material on a substrate 100, an alignment material supply unit 160 supplying an alignment material to the alignment material dropping unit 120, and an alignment material discharge testing unit 250 mounted to the alignment material dropping unit 120, and for observing a discharge state of the alignment material. Every component, except for the alignment material discharge testing unit 250, is the same as the components shown in FIG. 5, and the same reference numerals are given to the same components shown in FIG. 5.

The alignment material discharge testing unit 250 includes a plurality of scan units 210 and a monitor 220 for displaying an image based upon scan data from the scan unit 210. Each of the scan units 210 can include an optical receiving device for series of holes in a head or an optical receiving device for each of the holes in a head. In the alternative, an image interpreting unit 215 can be provided between the scan units 210 and the monitor 220 for receiving the scan data from each of the scan units 210, interpreting the scan data to produce representative data and transmitting the representative data to the monitor 220.

An individual scan unit of the scan units 210 is attached to each head 120a of the alignment material dropping unit 120 so that the discharge states of the alignment material dropping from every head 120a are simultaneously imaged by the scan units 210. In addition, since the scan units 210 can survey the movement of the alignment material dropping unit 120, even while the alignment material is dropped onto a substrate, the discharge state of the alignment material can be actively observed during processing. Thus, the inconvenience of testing every head one by one to check whether alignment material is properly being discharged as done in the testing using a test paper can be avoided.

Figure 8:
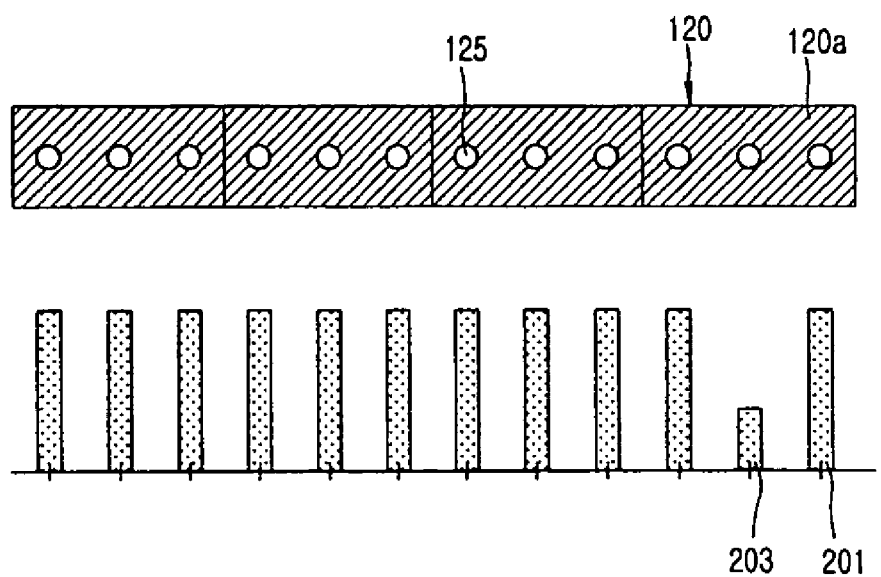
FIG. 8 is a graph showing a discharge state of alignment material displayed on a monitor corresponding to the holes in head part of an alignment layer forming apparatus.

FIG. 8 is a graph showing a discharge state of alignment material displayed on a monitor corresponding to the holes in head part of an alignment layer forming apparatus. By surveying the fall and duration of an alignment material columns from a head, the dispensing of a head can be accurately monitored. A monitor 220 can display a representative data based upon an optical scanning of an alignment material dispensed over time. Thus, the discharge amount and a discharge speed of the alignment material, which is being dropped onto a substrate, can be readily checked.

As shown in FIG. 8, the monitor can display the amount of the alignment material discharged as a representative image having the holes 125 in the heads 120a of the alignment material dropping unit 120 corresponding to a bar graph. More particularly, one bar graph 201 corresponds to one hole 125 of a head 120a and represents the discharge amount of alignment material from the hole 125. If bar graphs 201 for every hole 125 are the same in height, the same amount of the alignment material is being dropped from every hole. On the other hand, if a bar graph 203 corresponding to a specified hole is considerably lower in height as compared to other bar graphs, the alignment material is not being normally discharged because the specified hole is at least partially blocked.

Exemplary embodiments of the present invention provide an apparatus for forming an alignment layer of a liquid crystal display device using an inkjet method. More particularly, the alignment layer forming apparatus provides an alignment material discharge testing unit which detects whether an alignment material is properly discharged before formation of the alignment layer, thereby forming an alignment layer with uniform thickness. Also, in the present invention, uniformity of thickness of an alignment layer can be improved since a discharge state of an alignment material of each hole can be automatically checked through an alignment material discharge testing system including a scanning unit, a data interpreting unit, and a monitor. Accordingly, the testing time to detect whether an alignment material is properly discharged is shortened, and the thickness uniformity of the alignment layer is improved, thereby improving productivity.

It will be apparent to those skilled in the art that various modifications and variations can be made in the apparatus for forming an alignment layer of a liquid crystal display device of the present invention without departing from the spirit or scope of the invention. Thus, it is intended that the present invention cover the modifications and variations of this invention provided they come within the scope of the appended claims and their equivalents.

What is claimed is:

1. An apparatus for forming an alignment layer of a liquid crystal display device comprising:

an alignment material dropping unit with a plurality of heads having a plurality of holes for dropping an alignment material on a substrate, a plurality of heads being attachable each other;

an alignment material supply unit to supply the alignment material to the alignment material dropping unit;

a plurality of scan units structurally coupled to each head of the alignment material dropping unit to survey alignment material dropping from the heads, each scan unit scanning the alignment material dropped from the corresponding heads; and a monitor to display a plurality of images based upon scan data from the scan units so that a discharge state of the plurality of holes in each head can be checked, wherein the number of the heads to be attached each other is dependent upon the size of the substrate and the size of the holes and the distance between the holes are dependent upon the thickness of an alignment layer, wherein a plurality of holes in a plurality of heads are disposed along the first side of the substrate in a line and the alignment material is dropped onto the substrate along the second side of the substrate perpendicular to the first side.

2. The apparatus of claim 1, further comprising an alignment material supply pipe that connects the head and the alignment material supply unit.

3. The apparatus of claim 1, further comprising a data interpreting unit to receive scan data from the scan unit, to interpret the scan data to produce representative data and then to transmit the representative data such that a representative image is displayed on the monitor.

4. The apparatus of claim 3, wherein the representative image is a bar graph having a bar corresponding to each of the plurality holes.

5. The apparatus of claim 1, wherein the amount of alignment material discharged from the alignment material dropping unit is controlled by opening and closing the plurality of holes.

6. The apparatus of claim 1, wherein the amount of alignment material discharged from the alignment material dropping unit is controlled by the size of the plurality of holes.

7. The apparatus of claim 1, wherein the scan unit is mounted to the head such that the movement of alignment material onto a substrate can be monitored.

8. The apparatus of claim 1, further including a plurality of heads and a plurality of scan units such that each scan unit is mounted to correspond to each head.

9. The apparatus of claim 1, further including a plurality of optical receivers in the scan unit such that each optical receiver corresponds to each hole in the scan unit.

* * * * *